United States Patent [19]
Ghadimi

[11] 3,832,465
[45] Aug. 27, 1974

[54] INJECTABLE AMINO ACID COMPOSITION COMMENSURATE TO THE ANABOLIC NEED OF THE BODY AND METHOD OF USING SAME

[76] Inventor: Hossein Ghadimi, 3612 Berthu Dr., Baldwin, N.Y. 11510

[22] Filed: Aug. 17, 1972

[21] Appl. No.: 281,317

Related U.S. Application Data

[63] Continuation-in-part of Ser. No. 206,536, Dec. 9, 1971, abandoned.

[52] U.S. Cl.............. 424/177, 424/273, 424/274, 424/319
[51] Int. Cl............................................ A61k 27/00
[58] Field of Search............ 424/177, 319, 273, 274

[56] References Cited
UNITED STATES PATENTS

| | | | |
|---|---|---|---|
| 2,411,897 | 12/1946 | Sahyun | 424/319 |
| 3,080,234 | 3/1963 | Jarowski | 99/14 |

FOREIGN PATENTS OR APPLICATIONS

| | | | |
|---|---|---|---|
| 4048 M | 5/1966 | France | 424/319 |
| 931,016 | 7/1963 | Great Britain | 424/319 |

*Primary Examiner*—Albert T. Meyers
*Assistant Examiner*—Frederick E. Waddell
*Attorney, Agent, or Firm*—Francis W. Guay, Esq.

[57] ABSTRACT

Novel amino acid compositions suitable for intravenous alimentation are provided. They are composed by taking into account the fact that in intravenous alimentation, unlike ingestion, the administered amino acids do not pass through the liver before reaching other parts of the body. The compositions are ammonia-free, do not contain heretofore unidentified peptides and other impurities derived on protein hydrolysis, but contain cysteine, reduced amounts of methionine and increased amounts of branched-chain amino acids. They are tailored to the needs of the body at different ages and can be adapted to any desired requirement. Administered in recommended dosage the plasma-free amino acid content and proportion of the peripheral blood will remain within normal range.

11 Claims, No Drawings

INJECTABLE AMINO ACID COMPOSITION COMMENSURATE TO THE ANABOLIC NEED OF THE BODY AND METHOD OF USING SAME

CROSS-REFERENCE TO RELATED APPLICATION

The present application is a continuation-in-part of copending application Ser. No. 206,536, filed Dec. 9, 1971, now abandoned and entitled "INJECTABLE AMINO ACID COMPOSITION COMMENSURATE TO THE ANABOLIC NEED OF THE BODY AND METHOD OF USING SAME".

BACKGROUND OF THE INVENTION

1. Field of the Invention

The present invention relates to new and valuable pharmaceutical compositions and more particularly to pharmaceutical compositions containing amino acids to be administered intravenously and to a method of administering such pharmaceutical compositions for intravenous alimentation.

2. Description of the Prior Art

The intravenous administration of nutrients has a long history. The first successful injection of glucose was performed in 1896, and parenteral glucose administration has since become a routine procedure, employed for a wide variety of indications. Similarly, electrolytes, minerals and vitamins are now routinely administered by the intravenous route. It is difficult to walk into the ward of any hospital without seeing glucose or electrolytes being administered intravenously to a number of patients.

In contrast, intravenous administration of protein or amino acids is still a rarity at best, in spite of the fact that the first amino acid was discovered over 150 years ago. While human protein requirements have been studied for more than a century, and protein hydrolysates designed for intravenous use were available for more than three decades, the actual employment of such solutions remained extremely limited.

There are a number of reasons why the strides achieved in glucose, vitamin, and electrolyte alimentation were not matched in the area of intravenous protein nutrition. Glucose is a single substance with a relatively simple metabolic function. The requirements for glucose can be readily monitored by calculations and simple tests on urine and blood. Protein, on the other hand, consists of an array of individual amino acids serving a variety of metabolic needs and interacting with each other in complex ways. Quantitative determination of amino acids in body fluids has only recently come into use, and is still not readily available. Furthermore, the interpretation of such determinations requires expert knowledge. In conditions of dire protein starvation – as in kwashiorkor – the free amino acids of the blood determined by the best quantitative methods will be individually within normal levels, and thus offer no indication of protein starvation.

The amino acid solutions for intravenous alimentation which are currently available are based on analogy with oral requirements under experimental conditions. They are hydrolysates of naturally occurring proteins and contain impurities, most of which are undesirable and some of which are dangerous to the patient's well-being. The two major products in use are fibrin hydrolysates and casein hydrolysates. Recently, two amino acid mixtures have been introduced for investigational use in humans, one based on the amino acid pattern of fibrin and the other formulated in proportion to the protein in egg.

However, these products are in no way equal to the enormous potentialities opened up by technical, surgical, and medical advances in the art and science of parenteral alimentation, such as the pioneering work of S. J. Dudrick. Dudrick and his co-workers introduced hyperosmolar solutions directly into the central veins and showed that total parenteral alimentation was feasible. In addition to protein hydrolysate, the solutions used by Dudrick contained 10 to 25 percent of glucose, electrolytes, vitamins, and other nutrients.

All the presently available solutions of amino acids have serious drawbacks. They are the products of expediency, prepared in analogy with oral alimentation. They do not take into account the crucial consideration that in intravenous alimentation the liver is bypassed, and that consequently patients receiving intravenous nutrients are deprived of the effective monitoring and protective functions of the liver.

This point needs some elaboration. Nutrients absorbed from the guts are directly led into the liver through the portal veins. The liver acts thereby as a monitor of the body with great metabolic reserve power. It is, therefore, an effective checkpoint to offer relatively constant concentrations of amino acids for post-hepatic circulation. The different tissues of the body are, in normal life, exposed to the pattern of amino acids formulated by the liver. In intravenous alimentation, the port of entry of nutrients including the amino acids, however, is often the vena cava or catheter leading to the right atrium. The amino acids added to the blood stream at this distribution point, namely the heart, go to all parts of the body indiscriminately. Part of them, and only part of them, reaches the liver in each blood circulation cycle. If the injection of amino acids would have been one instantaneous shot, the clearance and the equilibrium probably would have been established within half an hour or so. However, the stream of infusion is continuous and throughout 24 hours or even days, weeks, and sometimes months. The resultant disturbed pattern thus continues to exist as long as amino acid infusion continues. Probably an analogy with dye tests will further elucidate this situation. Bromosulfalein (BSP) is a dye which is taken up by the liver cells very effectively. If injected into the portal vein of a healthy person in conventional doses, none will be recovered in the peripheral veins. However, since the portal vein is not easily accessible for injection, the dye is injected as a liver function test into a peripheral vein. In healthy persons complete clearance of the dye from the hepatic circulation takes more than 40 minutes.

Thus, while the liver is capable of handling almost any amino acid proportion resulting from digestion and absorption of naturally occurring proteins, the need of all other tissues for amino acids as well as the role of the liver in the amino acid metabolism must be taken into account when bypassing the liver. This has not been done heretofore in the available amino acid compositions for intravenous alimentation.

Secondly the presently available amino acid mixtures are formulated and used in analogy with glucose. While hyperglycemia of moderate degree may not cause any complications beyond glycosuria, persistently elevated amino acids of the blood may cause mental retardation. This potential danger should be taken into account if this type of treatment is administered early in life and for prolonged periods of time. As pointed out by Applicant in the article "Diagnosis of Inborn Errors of Metabolism" published in "Amer. J. Dis. Child." vol. 114, page 433 (1967), in the article "Aminoacidopathies and Mental Retardation" Howard University (Seminar), and in the article "The Genetic, Metabolic and Developmental Aspects of Mental Retardation" (in Press), over 50 percent of inborn errors of amino acid metabolism lead to mental retardation. In almost all amino-acidopathies, a high level of amino acid in blood is a persistent biochemical anomaly. Early correction of this anomaly in phenyl ketonuria leads to prevention of mental retardation. Assessment of retardation in early life is almost impossible, and long-range follow-up of the patients subjected to parenteral alimentation in infancy is not yet available. However, experiences indicate that a significant increase of blood amino acid levels beyond the upper normal limits does occur during parenteral alimentation, when using protein hydrolysate in conventional doses. The increases are not of the same magnitude as that observed with phenylalanine in phenylketonuria. On the other hand, in the present state of knowledge it is not known exactly what level of free amino acids in the blood should be considered toxic. The magnitude of the problem becomes apparent when it is realized that "toxic effect" means long-range effects on the growing brain and hence subnormal brain function or even gross mental retardation not amenable to therapy by the time the long-range effect is detectable by conventional techniques.

Another serious drawback of present amino acid preparations stems from the fact that they have not been formulated to meet biochemically established nutritional criteria, but are either breakdown products of certain arbitrarily selected priority models (i.e., egg protein).

Commercially available amino acid solutions suffer from an additional drawback, namely quantitative inaccuracy. Analysis of such solutions by quantitative technique shows, in some instances, over 100 percent discrepancy with respect to the indicated content of certain amino acids.

Potentially grave hazards are posed by ammonia contamination in the commercially available amino acid compositions and especially in fibrin and casein hydrolysates. Such ammonia contamination causes hyperammonemia, a pathologically high level of ammonia in the blood of patients undergoing intravenous alimentation, associated with abnormal liver function and a tendency in newborn to develop life-threatening acidosis.

The term "Fatal Hyperalimentation Syndrome" coined by S. E. Silvis and P. U. Paragas ("J.Lab.Clin. Med." vol. 78 (1971), No. 6, pages 918–930) probably refers to the pernicious effect of a high ammonia content in amino acid solutions.

SUMMARY OF THE INVENTION

It is one object of the present invention to provide new and valuable amino acid compositions for intravenous alimentation by injection directly into the big vessels or into the peripheral veins, which composition is free of the disadvantages and drawbacks of heretofore known and used amino acid compositions.

Another object of the present invention is to provide an amino acid composition which is especially designed for prolonged administration to newborns, prematures, and young infants and is formulated to meet the great anabolic needs of the newborn and yet to comply with the enzymic inadequacies typical of that particular age group.

A further object of the present invention is to provide an amino acid composition which is especially designed for prolonged intravenous alimentation to meet the need of children and adults.

Still another object of the present invention is to provide an amino acid composition which is designed for short period amino acid intravenous alimentation to supply essential amino acids in moderate amounts commensurate with the need of the body, excluding the need for catabolic pathway of the liver.

A further object of the present invention is to provide a method of intravenously administering the new and valuable amino acid compositions of the present invention.

Other objects of the present invention and advantageous features thereof will become apparent as the description proceeds.

In principle the amino acid compositions of the present invention are based on the fact that intravenously administered solutions bypass the liver. Consequently, such solutions, unlike orally ingested protein, avoid the major catabolic pathways of said organ. Therefore, the amino acid compositions of the present invention are designed so that their administration does not change the pattern of the free amino acids of the peripheral blood. In addition, unlike existing products, the amino acid compositions of the present invention take cognizance of the radical difference in the requirements of newborn versus older patients.

Although the body may tolerate amino acid compositions which do not have the ideal proportion of amino acids, there is no question that anabolic pathways will suffer and in the long range the results of administration of such compositions are far from being desirable.

Since hyperalimentation is generally used as lifesaving measure for a relatively long period of time, it becomes obvious that nothing but ideal solutions are adequate for the use in this technique. As a reflection of adequacy of amino acid composition, analysis of the blood amino acid will readily show the result of derangements imposed upon the body through solutions which do not reflect the need of the body.

Thus the amino acid composition for newborns, prematures, and young infants which will be designated hereinafter as composition GF-1, is based on the following findings:

Inravenous administration of methionine (an essential amino acid) even in amounts considerably below "minimal oral requirements" produced methionine blood levels exceeding normal by as much as ten-fold. At the same time, no cysteine was found in the blood. The explanation of these findings lies in the fact that young infants have a deficiency in the enzyme cystathionase and, therefore, are unable to convert methionine to cysteine. Thus, cysteine becomes an essential amino acid for newborn. Therefore, the amino acid composition for newborns, prematures, and young infants offers relatively small amounts of methionine (10 mg./kg. body weight, as compared to 85 mg./kg. body weight which constitutes minimal requirement). This amount is allowed in order to trigger the maturation of the enzyme. The balance of the requirement for sulfur-containing amino acids is met in the form of cysteine.

In contrast to methionine, it was observed that the infusion of branched-chain amino acids (leucine, isoleucine, valine) substantially in excess of minimal or even "safe" requirements (double the minimum) did not result in unduly raised amino acids in the plasma. Thus it was evident that the major metabolic pathways of leucine, isoleucine, and valine are outside of the liver. Since these three substances are directly or indirectly the major participants in protein synthesis, protein alimentation has been greatly simplified by using them as the main sources of amino acids in such an amino acid composition.

That the body is highly efficient in handling branched-chain amino acids is equally significant in the formulation of the amino acid composition useful for short period amino acid intravenous alimentation, which composition will be designated hereinafter as GF-3.

Because the bulk of the nitrogenous substances provided by this composition is contributed by the three branched amino acids leucine, isoleucine, and valine, the osmolarily is below 500 milliosmoles per liter and the preparation can be safely administered by peripheral vein. The successful administration of significant concentrations of amino acids by conventional intravenous techniques rather than by deep-vein catheterization is a major breakthrough. Using one arm for glucose and the other arm for amino acids, near-total alimentation can be achieved by a relatively simple procedure.

Preferably the branched amino acids leucine, isoleucine, and valine provide between about 42 percent and about 68 percent of the total amino acids present in the compositions of this invention. Best results are achieved when the proportion of leucine to isoleucine to valine is between about 1 : 1 : 1 and about 2 : 1 : 1.

With respect to histidine and lysine, the compositions of the present invention are consonant with the most advanced knowledge on the economy of these substances.

Preferably the amount of lysine in the composition is between about 2.8 percent and about 10.6 percent and the amount of histidine between 0 percent and about 5.0 percent of the total amount of amino acids in the compositions of this invention. Thereby the higher amounts of lysine are present in compositions of the GF-3 type while no histidine is required in such compositions.

Similarly, experiences with glutamine metabolism led to the drastically reduced provisions for glutamic acid and aspartic acid in these compositions.

Preferably the amount of glutamic acid as well as that of aspartic acid in the compositions is between 0 percent and about 1.5 percent of the total amount of amino acids present in the compositions of this invention.

The amino acid composition designed to meet children's and adults' need, which will be designated hereinafter as composition GF-2, is also based on rationales and approaches as mentioned hereinabove for the amino acid compositions of the GF-1 type and the GF-3 type as well as on information gained through years by administration of loading doses of amino acids and measuring the plasma response following the administration of loading.

To summarize the accumulated knowledge base on experience and other factors, the following simplification provides guide lines for formulating the amino acid compositions of the present invention. Accordingly the amino acids can be divided into three categories, as far as the ingestion and the role of the liver is concerned.

Group 1: Glutamine, glutamic acid and aspartic acid, which are kept to a minimum when the intravenous route is employed.

Group 2: Branched-chain amino acids (leucine, isoleucine, and valine). The liver seems to play a minor role in the economy of these three substances. The major metabolic pathways for these amino acids thus are beyond the liver. Therefore, they can be administered in abundance when the intravenous route is used.

Group 3: The remaining amino acids, namely methionine, cysteine, lysine, threonine, glycine, serine, histidine, phenylalanine, tyrosine, arginine, alanine, proline, and tryptophan, have their major metabolic pathways in the liver.

In general, the following clinical experience not only provides guidelines for formulating the quantities of amino acids in the three principal amino acid compositions of the present invention, but also insures the safety of administration as well as beneficial clinical effects.

A. Infusion at a constant rate is established through the use of Holder's pump.

B. After a period of stabilization of at least 24 hours, the rate of infusion is increased. Stepwise increase is achieved in some patients up to an equivalent of 6 g. of protein for 24 hours.

C. Blood samples are obtained before intravenous alimentation, following stabilization with known amounts of amino acids, and after cessation of intravenous alimentation. All samples are analyzed for an array of tests, including electrolytes, blood urea nitrogen, osmolarity, ammonia, liver function test, and free amino acids of plasma. Urinary collection is also obtained for most of the periods and samples are analyzed for creatinine, urea nitrogen, electrolytes, osmolarity, free amino acids etc. The accumulated data, as well as their correlation with the clinical status of the patient, are repeatedly and extensively studied. The blood level of each amino acid with respective intravenous intake is compared with the data available on oral intake, as well as the role of the liver in the metabolism of this particular amino acid.

The amino acid compositions of the present invention offer a correct level of the individual amino acids tailored to the need of the body in different stages of life. They use a meaningful terminology of mg. of amino acids or ml. of solution per kg. of body weight in contrast to the nomenclature of protein per kg. of body weight per day, as used in literature.

In short, the amino acid compositions of the present invention differ from the conventionally used solutions not only on theoretical grounds, but in practical aspects as well.

In general the amino acid compositions for newborns, prematures, and young infants, i.e., compositions of the GF-1 type are composed and administered as follows from the attached Table I.

The amino acid compositions for children and adults, i.e., compositions of the GF-2 type are composed and administered as follows from the attached Table II.

The amino acid compositions designed for short period amino acid intravenous alimentation, i.e., compositions of the GF-3 type are composed as follows from the attached Table III.

For long term total parenteral alimentation amino acid compositions with a higher concentration of tyrosine will be used. Working examples of such compositions with extra tyrosine are presented in the attached Table VII. In these formulas tyrosine is supplied as free tyrosine together with a tyrosine compound such as tyrosinamide, or a dipeptide such as glycyl-tyrosine, tyrosyl-glycine, tyrosyl-isoleucine, alanyl-tyrosine, leucyl-tyrosine and the like. These tyrosine compounds will provide the body with a pool of tyrosine compound, which will be available as free tyrosine upon the breakdown of the compounds. This embodiment of the present invention will decrease the chances of transient tyrosinemia due to delay in catabolic pathway of tyrosine.

To demonstrate the rationale of providing a tyrosine compound in the amino acid compositions of the present invention, the known metabolic pathway of phenylalanine/tyrosine is presented in Table IX. The anabolic pathway of hydroxylation of tyrosine to dopa and further conversion to adrenalin, noradrenalin, polymerization of dopa to melanine, and combination of tyrosine with iodine to provide mono-and di-iodo-tyrosine require very little tyrosine. From the point of view of economy of tyrosine in the body, the major metabolic pathway of the substance is through further oxidation on the chain to dihydroxyphenylpyruvic acid. This substance through a number of reactions ends up in carbon dioxide and water. The enzyme in the first and the second step of this catabolic pathway is very "capricious." Often in mild parenchymal liver disease the first abnormal finding is increased blood tyrosine. Similarly in newborns, especially in prematurely born infants, immaturity of these enzymes has been documented. Transient tyrosinemia, therefore, occurs with a high protein diet in early neonatal period. Since the major catabolic pathway of tyrosine is located in the liver, tyrosine in pure form should be supplied in small amounts so that transient tyrosinemia can be avoided. On the other hand, in the long term parenteral alimentation, provision of a source of extra tyrosine is advisable so that the anabolic pathway of dopa, etc. will not be compromised.

The amino acids used in said compositions are of the natural L-configuration and are preferably commercially available, substantially pure crystalline amino acids. Protein hydrolysates that will give a pattern of amino acids which can be modified to the specifications given hereinabove for the compositions according to the present invention may also be used provided they are free of ammonia, heretofore unidentified peptides, and other undesirable impurities.

The amino acids are dissolved in pyrogen-free sterile water. To preserve cysteine hydrochloride in solution, it is advisable to add an adequate amount of sodium bisulfite or any other compatible preserving agent.

The solution is preferably slightly alkaline. If desired, it can be readily adjusted to the pH of the blood (7.39) by the addition of a suitable non-toxic organic compound such as acetic acid or citric acid. However, such adjustment is generally not required, since the solutions are commonly mixed with glucose solutions and the final mixture ends up on the acid side. (Glucose solutions have a pH that ranges from 4 – 5; the pH of 10 percent glucose is 4.89). Commercially available amino acid mixtures are acidic. The use of these commercial preparations, therefore, results in a significantly greater level of titratable acidity than is the case with the amino acid solutions according to the present invention.

DESCRIPTION OF THE PREFERRED EMBODIMENTS

The following examples serve to illustrate the present invention without, however, limiting the same thereto.

Example 1

Amino acid composition for neonatal period and early infancy

The composition contains the amounts of pure crystalline amino acids in their L-configuration as given in the attached Table IV. The third column of said Table indicates the approximate amount of amino acid in mg./kg. of body weight when an average dose of 25 ml./kg. of the amino acid solution is administered. Each 100 ml. of this amino acid composition which is designated as GF-1, are equivalent of about 7.6 g. of protein and will supply about 30 calories. 20 ml./kg. to 60 ml./kg. of body weight administered daily are equal to about 1.6 g. to 4.8 g. of protein per kg. of body weight daily. Administration of 25 ml./kg. of body weight will give sufficient amino acids to maintain anabolic pathway of growing newborns. For prematures under 1000 g. birth weight the recommended dose is 10 ml./kg. of body weight for the first day. This dose can be built up to 28 or 30 ml./kg. of body weight within a week. In general the dose may be adjusted depending on the degree of malnutrition and clinical state of the patient. When using higher doses, it is advisable to monitor the plasma amino acids by quantitatively analyzing the free amino acids. Suitable analytical techniques involve the use of the amino acid analyzer built according to the modifications described by Piez et al. in "Analyt. Biochem." vol. 1, p.187 (1960) of the technique originally described by Spackman et al. in "Analyt. Chem." vol. 30 p. 1190 (1958).

The amino acids are dissolved in distilled water to which 60 mg./100 ml. of potassium metabisulfite may be added. The osmolarity of the solution is about 650 milliosmoles/liter.

Example 2

Amino acid composition for children and adults

The composition contains the amounts of pure crystalline amino acids in their L-configuration as given in the attached Table V. The third element of said Table indicates the approximate amount of amino acid in mg./day for an adult of 70 kg. of body weight when an average dose of 500 ml./day of the amino acid solution is administered. Each 1000 ml. of this amino acid composition which is designated as GF-2, are equivalent to about 69 g. of protein and about 10 g. of nitrogen and will supply about 275 calories. The dose for adults is 500 to 1000 ml./day and for children, for every 10 lbs.

of body weight, 200 ml. up to 40 kg. of body weight. The dose can, of course, be increased according to clinical condition.

The amino acids are dissolved in distilled water to which 600 mg./1000 ml. of sodium bisulfite may be added. The osmolarity of the solution is about 550 milliosmoles/liter.

Example 3

Amino acid solution for short period intravenous alimentation.

The composition contains the amounts of pure crystalline amino acids in their L-configuration as given in the attached Table VI. As stated above, the solution which is designated as amino acid composition GF-3, is designated for short period amino acid intravenous alimentation to supply essential amino acids in moderate amounts commensurate with the need of the body, excluding the need for catabolic pathway of the liver. The osmolarity of the solution is 371 milliosmoles/liter. It can, therefore, be administered through peripheral vein. Each liter contains the equivalent of 51.5 g of protein, 7.2 g. of nitrogen and will supply 206 calories. The administration of two liters of solution will almost supply the essential body need of an adult for amino acids without causing derangement of the amino acids of the plasma.

The amino acids are dissolved in distilled water to which 600 mg./1000 ml. of sodium bisulfite may be added.

The GF-3 solution is intraveneously administered, for instance, by slow intravenous injection at a rate of about 1 liter in about 24 hours (for adults).

Example 4

Modified amino acid composition for neonatal period and early infancy

The composition contains the amounts of pure crystalline amino acids in their L-configuration as given in the attached Table VII in the column designated as GF-1a. The composition differs from that of Example 1 by having an increased amount of tyrosine in the form of tyrosine and a tyrosine dipeptide with another amino acid, preferably with glycine, isoleucine, alanine, or leucine.

The composition GF-1a is prepared by following the procedure as described in Example 1.

Example 5

Modified amino acid composition for children and adults

The composition contains the amounts of pure crystalline amino acids in their L-configuration as given in the attached Table VII in the column designated as GR-2a. The composition differs from that of Example 2 by having an increased amount of tyrosine in the form of tyrosine and a tyrosine dipeptide with another amino acid, preferably with glycine, isoleucine, alanine, or leucine.

The composition GF-2a is prepared by following the procedure as described in Example 2.

Example 6

Modified amino acid solution for short period intravenous alimentation

The composition contains the amounts of pure crystalline amino acids in their L-configuration as given in the attached Table VII in the column designated as GF-3a. The composition differs from that of Example 3 by having an increased amount of tyrosine in the form of tyrosine and a tyrosine dipeptide with another amino acid, preferably with glycine, isoleucine, alanine, or leucine.

The composition GF-3a is prepared by following the procedure as described in Example 3.

The attached Table VIII is given to show the differences in the amino acid compositions according to the present invention and some of the heretofore described and used amino acid compositions. This Table clearly shows a. the reduced methionine content,
b. the presence of cysteine,
c. the increased content of the branched-chain amino acids leucine, isoleucine, and valine, and in combination therewith
d. the presence of tyrosine to mention only the most pronounced differences. The amino acids are given in mg./100 ml.

Preparation *a* of said Table VIII is a fibrin hydrolysate;

Preparation *b* is an enzymatic casein hydrolysate which contains polypeptides;

Preparation *c* is a mixture of amino acids patterned according to amino acids corresponding to the protein of the egg; and Preparation *d* is a casein hydrolysate with added amounts of methionine, tryptophan, and phenyl alanine.

In contrast to all or some of the presently available mixtures including those given in Table VIII, the amino acid compositions according to the present invention are more particularly characterized by the following features:

1. They are free of ammonia.
2. They do not carry with them the possibility of impurities such as heretofore unidentified peptides which are present in some of the available preparations up to 30 % of total nitrogen.
3. They meet the requirements of various tissues of the body.
4. They do not cause undue increase in the concentration of amino acids in the blood, i.e., hyperaminoacidemia.
5. By their administration the function of the liver in amino acid metabolism is partly preempted. For instance, the liver makes cysteine from methionine; none of the commercially available solutions contains cysteine. In the compositions of the present invention substantial amounts of cysteine are supplied at the expense of methionine.
6. The branched-chain amino acids (leucine, isoleucine, and valine) are precursors of many non-essential amino acids. Their metabolic pathway was found to be beyond the liver. Therefore, they are supplied in abundance in the compositions of this invention while in the commercially available solutions their concentrations are relatively small.
7. The compositions of the present invention are tailored to the need of the body at different ages; thus, for instance, the composition for newborns GF-1 takes into account all the known enzymatic immaturities for this age.

8. The composition for short period alimentation GF-3 is of low osmolarity and thus allows injection into peripheral veins for amino acid administration. This greatly facilitates intravenous amino acid therapy.

9. The compositions of the present invention are made from naturally-occurring L-configurated amino acids, while the L-configurated amino acid solutions on the market are products of protein hydrolysates with the exception of one which, however, is also designated as a solution which is "chemically and pharmacologically related to protein hydrolysates."

Although the present composition is to be made from L-configurated amino acids, the D-isomers or DL-forms are not excluded, provided they would offer acceptable biological value. Thus the term "L-amino acid" as used in the specification and the claims annexed hereto includes D- and DL-forms, if desired.

The amino acids can, of course, also be present in the claimed compositions in the form of their acid addition salts in equimolecular amounts, for instance, tyrosine hydrochloride. Their physiologically compatible metal salts and especially their alkali metal salts can, of course, also be used.

It is understood that the amino acid compositions according to the present invention may vary in their amino acid content provided they contain cysteine and at least 40 percent of the branched chain amino acids leucine, isoleucine, and valine calculated for the total amino acid content of the composition, said branched chain amino acids preferably in the proportion between about 1 : 1 : 1 and about 2 : 1 : 1.

Lysine should be present in an amount between about 2.5 percent and about 11.0 percent of the total amount of amino acids present in the composition.

Histidine, glutamic acid, and aspartic acid can be omitted completely and the histidine content of the compositions should preferably not exceed above 5.0 percent, the glutamic acid content preferably not above 1.5 percent, and the aspartic acid content preferably not above 1.5 percent.

Arginine is required in relatively high amounts, preferably in amounts between about 3.5 percent and about 13.5 percent.

The amount of tyrosine should be relatively low, preferably between about 0.5 percent and about 4.0 percent. As stated above, tyrosine can be replaced by a dipeptide of tyrosine with another amino acid, preferably by the dipeptides glycyl-tyrosine, tyrosyl-isoleucine, alanyl-tyrosine, or leucyl-tyrosine. Of course, other dipeptides of similar structure may also be employed. Likewise tyrosinamide may be used for replacing tyrosine.

As stated above, the pH of the compositions according to the present invention is preferably on the alkaline side; the unadjusted pH values of the composition of the working examples 1 to 3 as given in Tables IV, V, and VI are 8.0, 8.2, and 7.5 respectively. These characteristic pH-values, too, are in contrast to the acid pH values of commercially available amino acid solutions. The pH value of casein hydrolysates is 5.37 and that of amino acid mixture in proportion to a protein is 6.12. The titratable acidity of these two colutions is 40.88 and 24.32 as reported by J. C. M. Chan et al. (Journ. Am. Med. Ass., vol. 220 (May 22, 1972), p. 1119). The acidity of the solution poses a problem especially when the solutions are administered to newborns. Often acidosis ensues. Acidosis, in turn, enhances the Respiratory Distress Syndrome which is the major cause of death of prematurely born infants. The alkalinity of the native solutions according to the present invention by itself is an advantage which should not be underestimated. These solutions are generally mixed with 5 percent to 25 percent glucose solutions before their intravenous administration. Thus, the pH of the final solution is in general very close to the pH of blood (7.39).

It is understood that in compositions according to the present invention the one or the other of the non essential amino acids, with the exception of cysteine and tyrosine, can be omitted. Whether and which of the non essential amino acids is omitted, can readily be determined by analyzing the plasma of the peripheral blood for its amino acid content. A composition which does not substantially alter the level of the free amino acids in such plasma on intravenous administration of the composition, can be used for intravenous alimentation.

Analytical methods for determining the amino acids in blood samples are described, for instance, by W. J. Conway in his book on "Micro-diffusion Analysis and Volumetric error" page 121, published by Lockwood, London 1947; by K. A. Piez and L. A. Morris (by means of automatic amino acid analyzer) in "Anal. Biochem." vol. 1, page 187 (1966). Information on the level of free amino acids in the plasma and the normal pattern are available in a number of textbooks such as: "The Metabolic Basis of Inherited Disease" (in related chapters of each amino acid), edited by J. B. Stanbury, J. B. Wyngaarden and D. S. Fredrickson, Third Edition, published by McGraw-Hill; in "Amino acid Metabolism and Genetic Variation," edited by W. L. Nyhan, published by McGraw-Hill, page 384; as well as in papers, for instance, by P. B. Hamilton (by ion exchange chromatography) in "Anal. Chem." vol. 35, page 2055 (1963); by J. C. Dickinson, H. Rosenblum, and p. B. Hamilton in "Pediatrics" vol. 36, page 2 (1965); by B. S. Lindblad and A. Baldesten (with a Beckman 120 B automatic amino acid analyzer) "Acta Paediat. Scand." vol. 50, page 37 (1967) and vol. 58, page 252 (1969); and by others.

As stated above, an essential characteristic of the compositions according to the present invention is that they are free of ammonia and also of polypeptides other than tyrosine-containing dipeptides.

The injectable aqueous vehicle used for preparing the amino acid compositions of the present invention is preferably sterile water. 5 percent to 10 percent dextrose solutions as they are used for intravenous alimentation, isotonic saline, and/or aqueous solutions containing potassium, magnesium, and/or calcium salts and/or required vitamins can also be used.

Other changes and variations in the amino acid content and proportions of the amino acid compositions of the present invention, in the amounts administered, and the like may be made by those skilled in the art in accordance with the principles set forth herein and in the claims annexed hereto.

Table I

| Amino Acid | Amount administered in mg./kg. of body weight |
|---|---|
| Methionine | 10–40 |
| Cysteine | 60–100 |
| Lysine | 75–200 |
| Threonine | 60–100 |
| Glycine | 80–150 |
| Serine | 80–150 |
| Leucine | 300–600 |
| Isoleucine | 200–600 |
| Valine | 200–600 |
| Histidine | 50–200 |
| Phenylalanine | 50–150 |
| Tyrosine | 10–100 |
| Glutamic acid | 0–60 |
| Aspartic acid | 0–60 |
| Arginine | 100–400 |
| Alanine | 100–300 |
| Proline | 50–100 |
| Tryptophan | 10–40 |
| Ornithine | 0–100 |
| Total | 1435–4050 |

Table II

| Amino Acid | Amount administered in mg./day for adult 70 kg. of body weight |
|---|---|
| Methionine | 600–1200 |
| Cysteine | 300–800 |
| Lysine | 700–1500 |
| Threonine | 500–1500 |
| Glycine | 500–2000 |
| Serine | 500–2000 |
| Leucine | 4000–10000 |
| Isoleucine | 4000–10000 |
| Valine | 4000–10000 |
| Histidine | 600–2500 |
| Phenylalanine | 600–2000 |
| Tyrosine | 250–1000 |
| Glutamic acid | 0–500 |
| Aspartic acid | 0–500 |
| Arginine | 1000–2000 |
| Alanine | 500–2000 |
| Proline | 500–3000 |
| Tryptophan | 200–800 |
| Ornithine | 0–500 |
| Total | 18750–53800 |

Table III

| Amino Acid | Amount in mg./1000 ml. |
|---|---|
| Methionine | 2000–4000 |
| Cysteine | 3000–5000 |
| Lysine | 5000–10000 |
| Threonine | 3000–5000 |
| Leucine | 10000–25000 |
| Isoleucine | 10000–25000 |
| Valine | 10000–25000 |
| Phenylalanine | 2000–3000 |
| Tyrosine | 500–3000 |
| Arginine | 2000–4000 |
| Tryptophan | 200–800 |
| Total | 47700–109800 |

Table IV

| Amino Acid | mg./100 ml. | mg./kg. of body weight on administration of 25 ml./kg. |
|---|---|---|
| Methionine | 60 | 15 |
| Cysteine | 340 | 85 |
| Lysine | 480 | 120 |
| Threonine | 240 | 60 |
| Glycine | 400 | 100 |
| Serine | 400 | 100 |
| Leucine | 1600 | 400 |
| Isoleucine | 800 | 200 |
| Valine | 800 | 200 |
| Histidine | 200 | 50 |
| Phenylalanine | 400 | 100 |
| Tyrosine | 50 | 12.5 |
| Glutamic acid | 50 | 12.5 |
| Aspartic acid | 50 | 12.5 |
| Arginine | 1000 | 250 |
| Alanine | 400 | 100 |
| Proline | 200 | 50 |
| Tryptophan | 120 | 30 |
| Ornithine | 0 | 0 |
| Total | 7590 | 1897.5 |

Table V

| Amino acid | mg./1000 ml. | mg./day for adult (70 kg. of body weight) |
|---|---|---|
| Methionine | 1600 | 800 |
| Cysteine | 800 | 400 |
| Lysine | 2400 | 1200 |
| Threonine | 3000 | 1500 |
| Glycine | 3000 | 1500 |
| Serine | 3000 | 1500 |
| Leucine | 12000 | 6000 |
| Isoleucine | 10000 | 5000 |
| Valine | 10000 | 5000 |
| Histidine | 3000 | 1500 |
| Phenylalanine | 5000 | 2500 |
| Tyrosine | 500 | 250 |
| Glutamic acid | 400 | 200 |
| Aspartic acid | 0 | 0 |
| Arginine | 8000 | 4000 |
| Alanine | 3000 | 1500 |
| Proline | 2000 | 1000 |
| Tryptophan | 1200 | 6000 |
| Ornithine | 0 | 0 |
| Total | 68900 | 34450 |

Table VI

| Amino Acid | mg./100 ml. |
|---|---|
| Methionine | 2000 |
| Cysteine | 3000 |
| Lysine | 5000 |
| Threonine | 3000 |
| Leucine | 10000 |
| Isoleucine | 10000 |
| Valine | 10000 |
| Phenylalanine | 4500 |
| Tyrosine | 500 |
| Arginine | 3000 |
| Tryptophan | 500 |
| Total | 51500 |

Table VII

Amino Acid Composition with Additional Tyrosine

| Amino Acids | Approximate Proportion in mg./100 ml. of Solution | | |
|---|---|---|---|
| | GF–1a | GF–2a | GF–3a |
| Glutamic acid | 50 | 40 | — |
| Aspartic acid | 50 | — | — |
| Alanine | 400 | 300 | — |
| Leucine | 1600 | 1200 | 1000 |
| Isoleucine | 800 | 1000 | 1000 |
| Valine | 800 | 1000 | 1000 |

Table VII-Continued

Amino Acid Composition with Additional Tyrosine

| Amino Acids | Approximate Proportion in mg./100 ml. of Solution | | |
|---|---|---|---|
| | GF–1a | GF–2a | GF–3a |
| Methionine | 60 | 160 | 200 |
| Cysteine | 340 | 80 | 300 |
| Lysine | 480 | 240 | 500 |
| Threonine | 240 | 300 | 300 |
| Tryptophan | 120 | 120 | 50 |
| Phenylalanine | 400 | 500 | 450 |
| Tyrosine + tyrosyl glycine * | 100–400 | 100–400 | 100–400 |
| Histidine | 200 | 300 | — |
| Glycine | 400 | 300 | — |
| Serine | 400 | 300 | — |
| Arginine | 1000 | 800 | 300 |
| Proline | 200 | 200 | — |
| Total | 7640–7940 | 6940–7240 | 5200–5500 |

*In place of tyrosyl-glycine, there can be used another low molecular weight dipeptide of tyrosine such as glycyl-tyrosine, tyrosyl isoleucine, alanyltyrosine, leucyl-tyrosine, or the like.

The amounts of amino acids of the known compositions are amounts as given by the manufacturer. In addition all the known preparations contain inordinate amounts of ammonia.

Table VIII

| Amino Acid | GF–1 | GF–2 | GF–3 | a | Preparation b | c | d |
|---|---|---|---|---|---|---|---|
| Methionine | 60 | 160 | 200 | 100 | 320 | 450 | 220 |
| Cysteine | 340 | 80 | 300 | — | — | — | — |
| Lysine | 480 | 240 | 500 | 400 | 700 | 770 | 350 |
| Threonine | 240 | 300 | 300 | 232 | 380 | 340 | 180 |
| Glycine | 400 | 300 | — | 208 | — | 1790 | — |
| Serine | 400 | 300 | — | — | — | 500 | — |
| Leucine | 1600 | 1200 | 1000 | 636 | 820 | 770 | 415 |
| Isoleucine | 800 | 1000 | 1000 | 218 | 500 | 590 | 240 |
| Valine | 800 | 1000 | 1000 | 163 | 600 | 560 | 300 |
| Histidine | 200 | 300 | — | 116 | — | 240 | 120 |
| Phenylalanine | 400 | 500 | 450 | 100 | 400 | 480 | 230 |
| Tyrosine | 50 | 50 | 50 | 110 | — | — | — |
| Glutamic acid | 50 | 40 | — | — | — | — | — |
| Aspartic acid | 50 | — | — | 30 | — | — | — |
| Arginine | 1000 | 800 | 300 | 290 | — | 310 | 150 |
| Alanine | 400 | 300 | — | — | — | 600 | — |
| Proline | 200 | 200 | — | — | — | 950 | — |
| Tryptophan | 120 | 120 | 50 | — | 80 | 130 | 50 |

Table IX
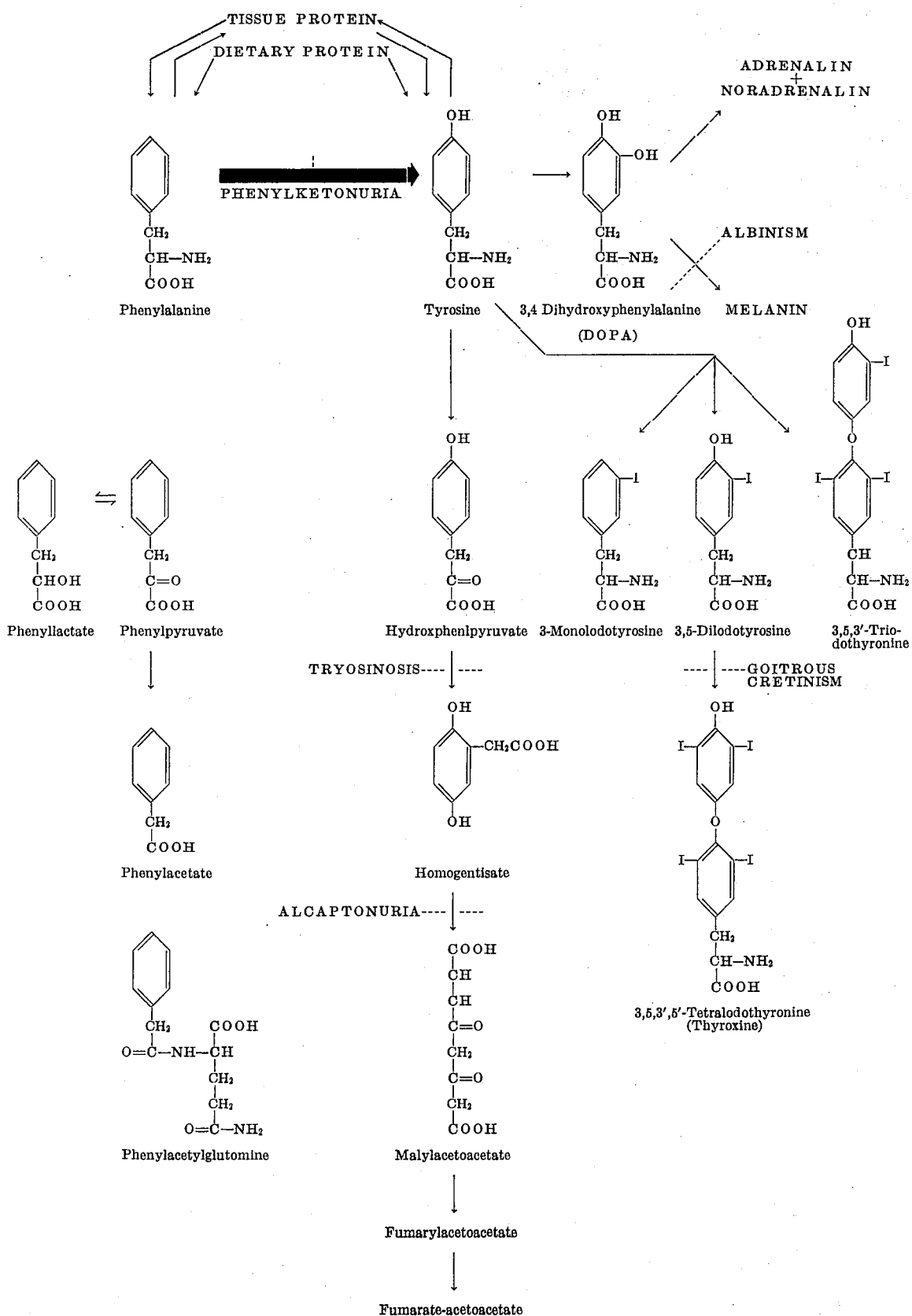

I claim:

1. An L-configuration amino acid composition for intravenous administration to newborns, prematures and patients in the neonatal period in which amino acids are present in proportion to the anabolic need of the body without heavily relying on the catabolic capability of the liver, the amino acid composition being essentially free of ammonia and consisting essentially of an aqueous solution of amino acids in which the total amino acid content is between about 4 percent and about 10 percent and in which at least about 40 percent of the total amino acid content of the composition is leucine, isoleucine, and valine in the relative proportion of between about 1:1:1 and about 2:1:1, the balance being amino acids in the proportions given below, based upon the total amino acid content of the composition, said composition containing

| Amino Acid | Proportion Range |
|---|---|
| Methionine | 10–40 |
| Cysteine | 60–100 |
| Lysine | 75–200 |
| Threonine | 60–100 |
| Glycine | 80–150 |
| Serine | 80–150 |
| Leucine | 300–600 |
| Isoleucine | 200–600 |
| Valine | 200–600 |
| Histidine | 50–200 |
| Phenylalanine | 50–150 |
| Tyrosine | 10–100 |
| Glutamic acid | 0–60 |
| Aspartic acid | 0–60 |
| Arginine | 100–400 |
| Alanine | 100–300 |
| Proline | 50–100 |
| Tryptophan | 10–40 |
| Ornithine | 0–100 |
| TOTAL | 1435–4050 |

2. The amino acid composition of claim 1, in which lysine is present in an amount between about 2.5 percent and about 11.0 percent of the total amount of amino acids in said composition.

3. The amino acid composition of claim 1, in which glutamic acid and aspartic acid are present each in an amount between about 0 percent and about 1.5 percent of the total amount of amino acids in said composition.

4. The amino acid composition of claim 1, in which arginine is present in an amount between about 3.5 percent and about 13.5 percent of the total amount of amino acids in said composition.

5. The amino acid composition of claim 1, in which tyrosine is present in an amount between about 0.5 percent and about 4 percent of the total amount of amino acids in said composition.

6. The amino acid composition of claim 1, in which the proportion of the branched-chain amino acids leucine to isoleucine to valine present in said composition is between about 1 : 1 : 1 and 2 : 1 : 1, lysine is present in an amount between about 2.5 percent and about 11.0 percent, and tyrosine is present in an amount between about 0.5 percent and about 4 percent of the total amount of amino acids in said composition.

7. The amino acid composition of claim 1, in which the proportion of the branched-chain amino acids leucine to isoleucine to valine present in said composition is between about 1 : 1 : 1 and about 2 : 1 : 1, lysine is present in an amount between about 2.5 percent and about 11.0 percent, arginine is present in an amount between about 3.5 percent and about 13.5 percent, and tyrosine is present in an amount between about 0.5 percent and about 4 percent of the total amount of amino acids in said composition.

8. The composition of claim 1 for intravenous administration to newborns, prematures and for the use in neonatal period, said composition containing dissolved in said aqueous vehicle the following L-amino acids in the following amounts in mg./100 ml.:

| Amino Acids | Amount mg./100 ml. |
|---|---|
| Methionine | 60 |
| Cysteine | 340 |
| Lysine | 480 |
| Threonine | 240 |
| Glycine | 400 |
| Serine | 400 |
| Leucine | 1600 |
| Isoleucine | 800 |
| Valine | 800 |
| Histidine | 200 |
| Phenylalanine | 400 |
| Tyrosine | 50 |
| Glutamic acid | 50 |
| Aspartic acid | 50 |
| Arginine | 1000 |
| Alanine | 400 |
| Proline | 200 |
| Tryptophan | 120 |
| Total | 7590, | each 100 ml. of said composition providing a mixture of amino acids equivalent to about 7.6 g. of protein and supplying about 35 calories, the osmolarity of said composition being about 650 milliosmoles/liter.

9. The composition of claim 5, in which part of the tyrosine is present in the amino acid composition in the form of a compound selected from the group consisting of tyrosinamide and a dipeptide selected from the group consisting of glycyl-tyrosine, tyrosyl-isoleucine, alanyl-tyrosine, and leucyl-tyrosine.

10. The composition of claim 8 having a pH of 8.0.

11. A process of supplying newborns, prematures or patients in the neonatal period with L-amino acids in amounts and proportions conforming to the anabolic need of the body, when the liver is bypassed, which comprises intravenously administering an effective amount of the composition of claim 1.

* * * * *